US008498918B2

(12) United States Patent
Ross et al.

(10) Patent No.: US 8,498,918 B2
(45) Date of Patent: Jul. 30, 2013

(54) SYSTEM AND METHOD FOR A REQUEST FOR CROSS IN A TRADE MATCHING ENGINE

(75) Inventors: Robin S. Ross, Chicago, IL (US); Peter O. Barker, Chicago, IL (US); Neal Brady, Evanston, IL (US); John Curran, Chicago, IL (US); Jeffrey P. Kilinski, Glen Ellyn, IL (US); David Salvadori, Bartlett, IL (US)

(73) Assignee: Chicago Mercantile Exchange, Inc., Chicago, IL (US)

( * ) Notice: Subject to any disclaimer, the term of this patent is extended or adjusted under 35 U.S.C. 154(b) by 91 days.

(21) Appl. No.: 11/421,981

(22) Filed: Jun. 2, 2006

(65) Prior Publication Data

US 2006/0277138 A1 Dec. 7, 2006

Related U.S. Application Data

(60) Provisional application No. 60/687,183, filed on Jun. 3, 2005.

(51) Int. Cl.
*G06Q 40/00* (2012.01)
(52) U.S. Cl.
USPC .......................................... 705/37; 705/36 R
(58) Field of Classification Search
None
See application file for complete search history.

(56) References Cited

U.S. PATENT DOCUMENTS

| 5,873,071 | A * | 2/1999 | Ferstenberg et al. ....... 705/36 R |
| 7,024,387 | B1 * | 4/2006 | Nieboer et al. ................. 705/37 |
| 7,209,896 | B1 * | 4/2007 | Serkin et al. ..................... 705/37 |
| 7,246,093 | B1 * | 7/2007 | Katz ................................. 705/37 |
| 7,430,533 | B1 * | 9/2008 | Cushing ........................... 705/37 |
| 7,558,753 | B2 * | 7/2009 | Neubert et al. .................. 705/37 |
| 2002/0052824 | A1 * | 5/2002 | Mahanti et al. ................. 705/37 |
| 2002/0052827 | A1 | 5/2002 | Waelbroeck et al. |
| 2002/0156719 | A1 * | 10/2002 | Finebaum et al. .............. 705/37 |
| 2002/0184136 | A1 * | 12/2002 | Cleary Neubert et al. ...... 705/37 |
| 2003/0093343 | A1 * | 5/2003 | Huttenlocher et al. ......... 705/35 |
| 2003/0115128 | A1 * | 6/2003 | Lange et al. ..................... 705/37 |

(Continued)

FOREIGN PATENT DOCUMENTS

| JP | 2001325447 | 11/2001 |
| JP | 2004054643 | 2/2004 |
| JP | 2004054643 | 12/2004 |
| JP | 2005025333 | 1/2005 |

OTHER PUBLICATIONS

Self-Regulatory Organizations; Pacific Exchange, Inc.; Notice of Filing of Proposed Rule Change and Amendment No. 1 Thereto Relating to the Establishment of a Portfolio Crossing Service The Federal Register / FIND. Lanham: Sep. 28, 2005. vol. 70, Iss. 187; p. 56762 at http://proquest.umi.com/pqdweb?did=1030221031&sid=2 &Fmt=3&clientId=19649&RQT=309&.*

(Continued)

*Primary Examiner* — Ella Colbert
*Assistant Examiner* — Mary Gregg
(74) *Attorney, Agent, or Firm* — Banner & Witcoff, Ltd.

(57) ABSTRACT

Systems and methods are provided to fulfill customer trading orders in an illiquid two sided market. Request for cross functionality may be implemented in a trading environment using a trading engine for the matching of trades involving financial instruments. Request for cross functionally integrates the benefits of a dual bid-ask continuous trading market model with the price and quantity trade matching systems and methods.

14 Claims, 6 Drawing Sheets

U.S. PATENT DOCUMENTS

| | | | |
|---|---|---|---|
| 2003/0120585 A1* | 6/2003 | Rosenblatt | 705/37 |
| 2003/0130929 A1 | 7/2003 | Waddell | |
| 2003/0177086 A1* | 9/2003 | Gomber et al. | 705/37 |
| 2004/0030630 A1* | 2/2004 | Tilfors et al. | 705/37 |
| 2004/0059666 A1* | 3/2004 | Waelbroeck et al. | 705/37 |
| 2004/0210511 A1* | 10/2004 | Waelbroeck et al. | 705/37 |
| 2004/0215538 A1* | 10/2004 | Smith et al. | 705/35 |
| 2005/0091142 A1* | 4/2005 | Renton et al. | 705/37 |
| 2005/0160024 A1* | 7/2005 | Soderborg et al. | 705/37 |
| 2005/0222936 A1* | 10/2005 | Panariti et al. | 705/37 |
| 2005/0222937 A1* | 10/2005 | Coad et al. | 705/37 |
| 2006/0020536 A1* | 1/2006 | Renton et al. | 705/37 |
| 2006/0080220 A1* | 4/2006 | Samuel et al. | 705/37 |
| 2006/0206404 A1* | 9/2006 | Hatheway et al. | 705/37 |
| 2006/0218071 A1* | 9/2006 | Sweeting | 705/37 |
| 2006/0253353 A1* | 11/2006 | Weisberger | 705/35 |
| 2007/0112693 A1* | 5/2007 | Cushing | 705/400 |

OTHER PUBLICATIONS

Pacific Exhange Stock & Option; rule adoption notice; Ran-04-47 Oct. 21, 2004; 8 pages www.tradearca.com/content/regulation/reg/ran/2004/PCX_RAN-04-47.pdf.*

Federal Register: Apr. 20, 20047 (vol. 69, No. 76); Notices; p. 21174-21176; From the Federal Register Online via GPO Access [wais. access.gpo.gov]; [DOCID:fr20ap04-109].*

NYSE Arca Equities Rule 7, printed from http://nysearcarules.nyse. com/PCXtools/PlatformViewer.asp? SelectedNode=chp_1_1 &manual=/PCX/PCXRules/pcx-rules/ on Aug. 9, 2011.

Japanese Patent Application No. 2008-514951 Office Action dated Nov. 22, 2011.

Communication with Supplementary European Search Report for EP06772096.3 dated May 25, 2010.

Notice of Reasons for Rejection in JP2008-514951 dated Nov. 22, 2011, with English translation.

International Search Report in PCT/US06/21663 mailed Aug. 7, 2007.

Written Opinion in PCT/US06/21663 mailed Aug. 7, 2007.

International Preliminary Report on Patentability with Written Opinion in PCT/US06/21663 issued Dec. 6, 2007.

* cited by examiner

|  | 402 |  | 404 |  |
|---|---|---|---|---|
|  | Qty | $ | $ | Qty |
|  | 2000 | 2.0 | 3.0 | 5000 |
|  |  |  |  |  |

Figure 4

|  | Qty | $ | $ | Qty |
|---|---|---|---|---|
|  | 3000 | 2.5 | 2.5 | 3000 |
|  | 2000 | 2.0 | 3.0 | 5000 |

Figure 5

|  | Qty | $ | $ | Qty |
|---|---|---|---|---|
|  | 2000 | 2.0 | 3.0 | 5000 |
|  |  |  |  |  |

Figure 6

|     | 702 |     |     | 704 |     |
|-----|-----|-----|-----|-----|-----|
| Qty |     | $   | $   |     | Qty |
| 2000 |    | 2.0 | 3.0 |     | 5000 |
|     |     |     |     |     |     |

Figure 7

| Qty |     | $   | $   |     | Qty |
|-----|-----|-----|-----|-----|-----|
| 2500 |    | 2.0 | 3.0 |     | 5000 |
|     |     |     |     |     |     |

Figure 8

| Qty |     | $   | $   |     | Qty |
|-----|-----|-----|-----|-----|-----|
|     |     |     | 3.0 |     | 5000 |
|     |     |     |     |     |     |

Figure 9

| Qty |     | $   | $   |     | Qty |
|-----|-----|-----|-----|-----|-----|
| 5500 |    | 2.0 | 2.0 |     | 3000 |
|     |     |     | 3.0 |     | 5000 |

Figure 10

| Qty |     | $   | $   |     | Qty |
|-----|-----|-----|-----|-----|-----|
|     |     |     | 3.0 |     | 5000 |
|     |     |     |     |     |     |

| Qty | $ | $ | Qty |
|---|---|---|---|
| 2000 | 2.0 | 2.5 | 5000 |

Figure 13

| Qty | $ | $ | Qty |
|---|---|---|---|
| 20,000 | 1.0 | 1.5 | 8,000 |

Figure 14

| Qty | $ | $ | Qty |
|---|---|---|---|
| 800 | 2.0 | 2.0 | 8,800 |
| 20,000 | 1.0 | | |

Figure 15

| Qty | $ | $ | Qty |
|---|---|---|---|
| 800 | 2.0 | 2.0 | 3,800 |
| 20,000 | 1.0 | | |

Figure 16

| Qty | $ | $ | Qty |
|---|---|---|---|
| 20,000 | 1.0 | 2.0 | 3,000 |
| | | | |

SYSTEM AND METHOD FOR A REQUEST FOR CROSS IN A TRADE MATCHING ENGINE

This application claims the benefit of U.S. Provisional Application No. 60/687,183, filed Jun. 3, 2005, the entire disclosure of which is hereby incorporated by reference.

FIELD OF THE INVENTION

The invention relates to exchange trade matching systems and methods. More particularly, the invention relates to implementation of a request for cross functionality (RFC) into the trading environment.

DESCRIPTION OF THE RELATED ART

In existing exchanges, when a user wants to place an order in a continuous two sided market, their bids or offers are submitted and an attempt to match the users order is conducted. The bids and offers are placed in the book and are matched in real time on a price-time priority basis.

If there is no match or the customer does not want to take an existing bid/offer, as the price is not appropriate, in a conventional trading system the user would enter the price they want for the product into an order book and wait for a match to occur. However, in an illiquid market that order may rest in the order book for a long time and may never match. Therefore, there is a need in the art for a more robust and efficient trade matching system and method.

SUMMARY

Aspects of the present invention overcome problems and limitations of the prior art by providing request for cross functionality. The request for cross functionality integrates the benefits of the dual bid-ask continuous trading market model with the price and quantity trade matching systems and methods.

In an aspect of the invention, a request for quote may be submitted to determine the liquidity of a particular instrument of interest to a broker and/or customer. In response to the request for quote, orders or quotes may be submitted by market participants. The broker may receive an initiating order from a customer. If no match can be found for the customer's order, the broker may contact various market makers in order to request their best price for the other side of the customer's order without revealing the full information about the quantity, price, and buying/selling side of the product. Once a market maker has been found a request for cross is initiated and the marketplace is informed that a match will occur for the product. Additional market participants upon being informed that a match will occur may place new orders for the product within a specified time frame enabling the customer to complete his/her order.

Details of the invention are set forth in the accompanying drawings and the description below. Other features and advantages of the invention will be apparent from the description, drawings, and claims.

BRIEF DESCRIPTION OF THE DRAWINGS

The present invention may take physical form in certain parts and steps, embodiments of which will be described in detail in the following description and illustrated in the accompanying drawings that form a part hereof, wherein:

FIGS. 7-11 show the type of data that may be included in an order book in a second illustrative example of the invention in accordance with an aspect of the invention.

DETAILED DESCRIPTION

In order to clarify the description, definitions of several terms are provided. The terms are exemplary and are not intended to be limiting of the scope of the invention.

1) Broker—An intermediary who provides a transaction service between market makers and customers and/or between two customers.
2) Broker Match Guarantee (BMG)—A trade engine guaranteed match event occurring at the conclusion of the Pre-Cross period between parties specified by the Broker.
2A) Better Price Match (BPM)—A trade engine guaranteed match event occurring when the RFC price is better than the order book prices at the time the RFC is received and the order book prices are not through the RFC price at the conclusion of the Pre-Cross period between parties specified by the Broker.
3) Call Around—Broker method of contacting market makers and determining their willingness to commit to take the opposite side of an Initiating Order.
4) Customer—A user who utilizes a Broker to transact orders on their behalf.
5) Initiating Order—Customer side order.
6) Market Maker—A user who provides liquidity in response to a RFQ or RFC.
7) Pre-Cross Period—Time period related to a first of two RFC match process cycles.
8) Remaining1—The residual quantity remaining after the BMG match event has completed.
9) Request for Cross (RFC)—A market alert mechanism that indicates that a match will occur for an instrument.
10) Request for Quote (RFQ)—A market alert mechanism initiated by a Broker that asks the marketplace to post liquidity for an instrument.
11) Cross Period—Time period related to the second of two RFC match process cycles.

Figure 1:
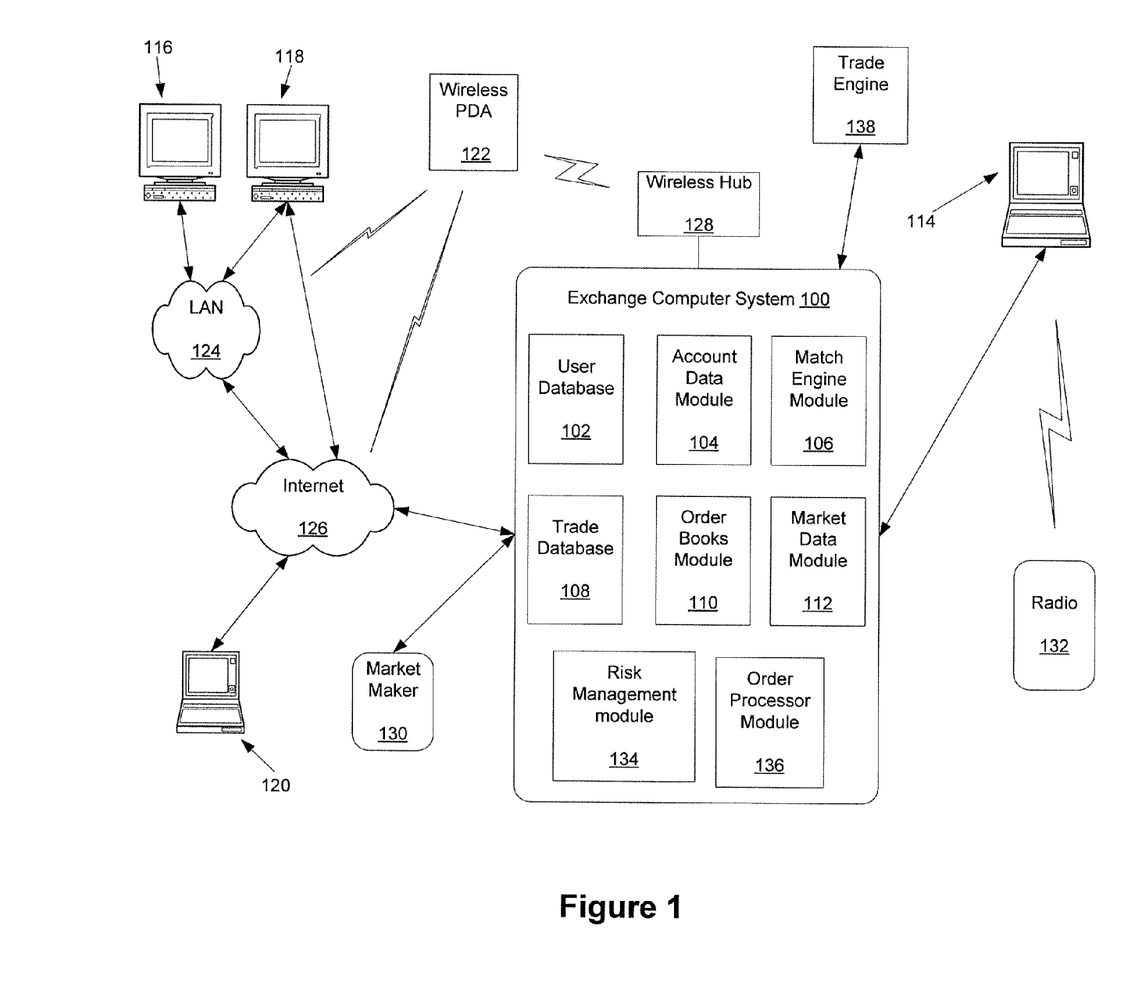
FIG. 1 illustrates a computer network system that may be used to implement aspects of the present invention.

Aspects of the present invention are preferably implemented with or used in conjunction with computer devices and computer networks. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords.

An account data module 104 may process account information that may be used during trades. A match engine module or trade matching engine 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order books module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processor module 136 may be included to decompose delta based and bulk order types for processing by order book module 110 and trade matching engine 106.

The trading network environment shown in FIG. 1 includes computer devices 114, 116, 118, 120, and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

In an aspect of the invention, a user wants to place an order in a continuous two sided market (bids and offers are in the book and matched in real time on a price-time priority basis). However, the user does not want to take an existing bid/offer that is resting in the book, as the price, for example, may not be satisfactory to the user. Moreover, the prices may or may not be posted for a given instrument such as the Eurodollar option or Eurodollar future.

Figure 2:
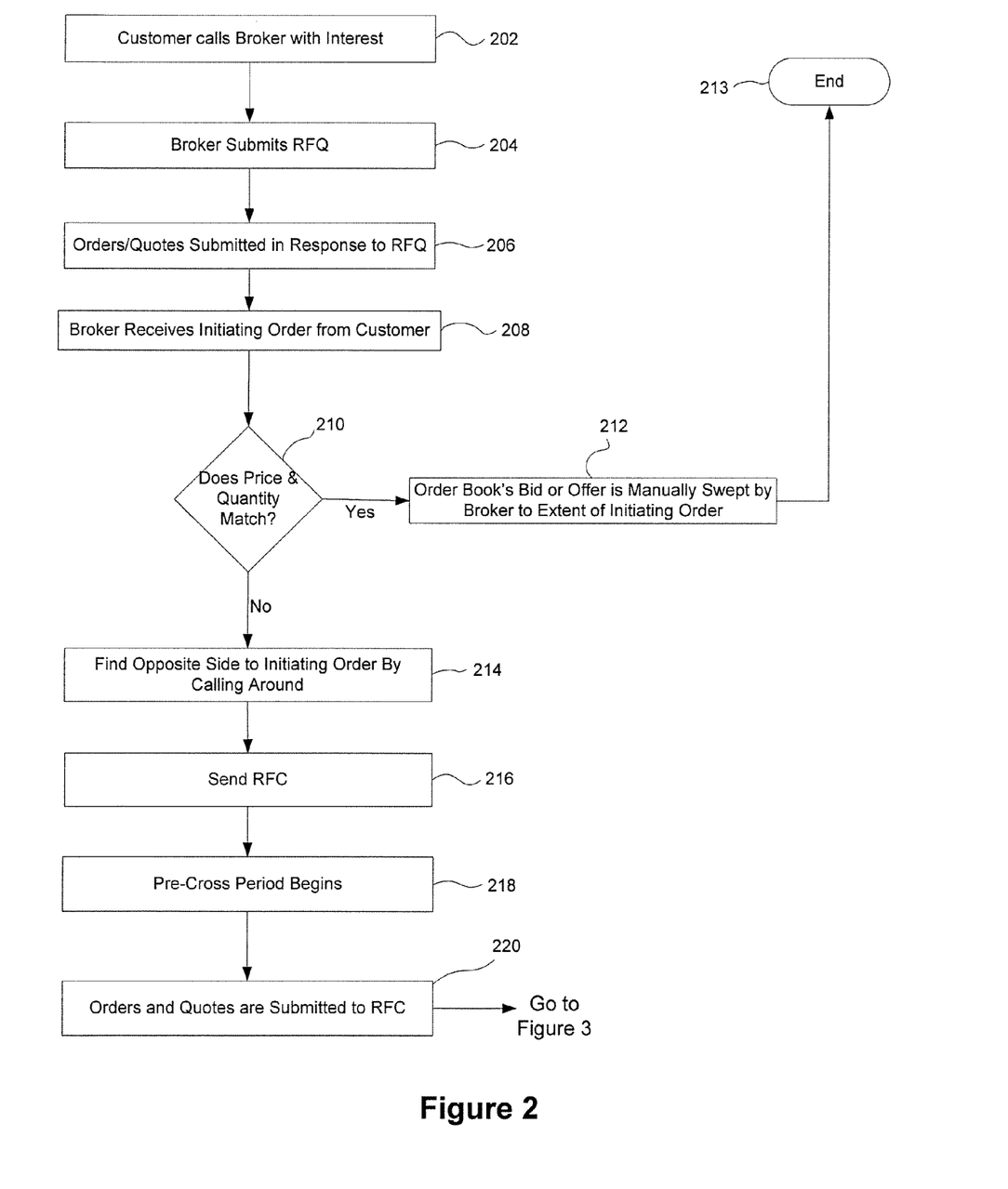
FIG. 2 illustrates a method of Requesting a Crossing of a trade in a trade matching engine in accordance with an aspect of the invention.
Figure 3:
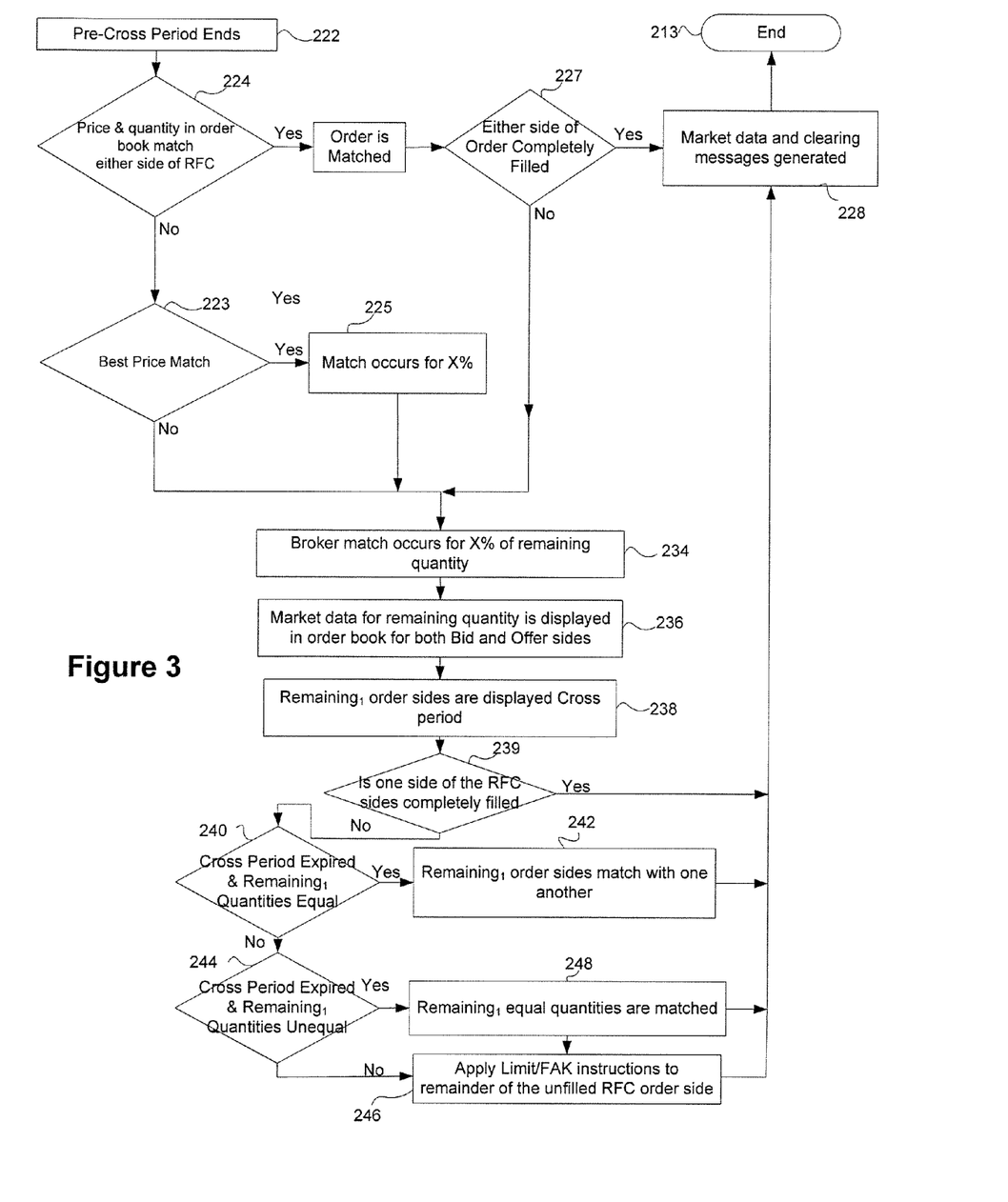
FIG. 3 further illustrates a method of Requesting a Crossing of a trade in a trade matching engine in accordance with an aspect of the invention.

Referring to FIGS. 2 and 3, a method of requesting a cross in a trade matching engine 106 is illustrated in accordance with an aspect of the invention. In a first step 202, a customer may contact a broker to express an interest for a various trade.

In response to the customer inquiry, the broker in a step 204 may submit a request for quote (RFQ). The RFQ may ask the marketplace to post liquidity for a particular instrument of interest to the broker and customer. In response to the RFQ, orders or quotes may be submitted by other market participants as illustrated in step 206. In step 208, the broker may receive an initiating order from a customer. The initiating order may include the price and quantity requested by the customer.

In step 210, the price and quantity requested by the customer may be compared to orders that have been entered into an order book. If the price and quantity in the order book fully meet the customer's initiating order, then in step 212 the order book's bid or offer is manually swept by the broker to the extent of the initiating order. As the customer's order has been completed the process ends at step 213. Other non-RFC related matching may occur on the order book during the entire RFC process.

However, if the price and quantity entered in the order book do not fully meet the customer's initiating order then, the broker may call around in step 214 to find an opposite side to the customer's initiating order. For example, a customer's broker, in order to find a match, may contact various market makers (MMs) and request their best price for the other side of the customer's order without revealing the full order information (maybe only the quantity and the type of product). Communications between broker and customer may be accomplished through various media such as e-mail, instant messaging, telephone, and/or other communication devices or methods. Those skilled in the art will realize that other forms of communication may be utilized in order to find an opposite side to the customer's initiating order.

If one or more market makers agree to take the other side of the order at the price and quantity desired by the customer, the following steps may occur. In step 216, the broker initiates a two sided request for cross (RFC) message. The two sided RFC message may include additional information such as account numbers for the buy side and the sell side. Other information such as order type instructions to be applied after the RFC has expired may also be included. Such instructions may include FAK (Fill and Kill) and/or limit session instructions. In addition, the matching engine or match engine module 106 may terminate the RFC request (step 213), if at anytime either side of the order is fully matched. For example, the termination of the RFC may occur when the order is fully matched during such times as at the end of the Pre-Cross period, anytime during the Cross period, or anytime at the end of the Cross period.

When the trade matching engine or match engine module 106 accepts the RFC, then in step 218 a Pre-Cross period begins. The two sided RFC message may be sent out on the market data feed indicating to all market participants that a request for cross (RFC) in a particular product has occurred. The price and quantity may not be revealed to the market participants, only the existence of the RFC. The informed market participants may know that that the RFC was issued. This may allow additional market participants to submit orders to the order book. The trade matching engine 106 may inform the trading community of the RFC at many different stages of the RFC process such as when the RFC is accepted by the trade matching engine 106 or when a particular time period has expired. For instance, trade matching engine 106 may broadcast messages to market participants after a first time period and a second time period have expired.

In step 220, orders and quotes may be submitted in response to the RFC during the Pre-Cross period. The Pre-Cross period may include a time period such as 15 seconds before proceeding to allow new orders to be sent to the system. Those skilled in the art will realize that the time period of 15 seconds is exemplary and that a longer or shorter time period may be utilized. In addition, the time period may be different for various different products such as Eurodollar options and Eurodollar futures. In step 222 of FIG. 3, the Pre-Cross period expires after the selected time period. A message may be generated to acknowledge the expiration of the Pre-Cross period. A flag may also be utilized to indicate the Pre-Cross period expiration.

Next, in step 224 price and quantity may be compared to orders in the order book to see if price and quantity match either side of the RFC. If price and quantity match either side of the RFC, then orders may be automatically matched by the trade matching engine (106) to the extent of either of the RFC's order sides. The use of regular match algorithms by the trade matching engine (106) may apply.

In step 227, the trade matching engine 106 may check to determine whether either side of the order was completely filled. If either side of the RFC order was completely filled then the RFC may be ended (step 213) and the remaining side of the order may be subject to FAK or limit/session instructions as dictated in the original RFC submission. Moreover, market data and clearing messages may be generated in step 228. If only a portion of either side of the RFC order was matched then the remaining portion advances to step 234.

If price and quantity do not match either side of the RFC (step 224), then in step 223 it may be determined if a Better Price Match (BPM) allocation will be applied. A BPM allocation may occur if the RFC price is better than the existing order book bid and ask prices at the time the RFC is received by the matching engine (i.e. the beginning of the Pre-Cross period) and the order book prices are not through the RFC price at the conclusion of the Pre-Cross period. The Better Price Match (BPM) allocation occurs for twenty-five percent (step 225) of the RFC order quantity. Those skilled in the art will realize that the allocation percentage is exemplary and may be higher or lower in various different aspects of the invention. In addition, in an aspect of the invention, the BPM allocation may not be changed during a particular trading session. In other aspects of the invention, the BPM allocation may be defined to two decimal places, may be rounded down, and may not be greater than 100 percent. Market data and clearing messages may be generated.

Next, in step 234, a Broker Match Guarantee (BMG) allocation may occur for sixty (60) percent of the remainder of the order (customer order amount less matched above). Those skilled in the art will realize that the allocation percentage is exemplary and may be higher or lower in various different aspects of the invention. In addition, in an aspect of the invention, the BMG may not be changed during a particular trading session. In other aspects of the invention, the BMG may be defined to two decimal places, may be rounded down, and may not be greater than 100 percent. The market maker allocation may then be matched against the customer's order. Even if there are no resting orders to be matched with either side of the RFC, the BMG may still be applied to the RFC. The opposing sides of the BMG's allocation percentage may be the customer side (initiator side) and the market maker side.

In step 236, the customer's order and market maker's order for the residual amount may be automatically displayed in the order book for both bid and offer sides (Remaining1). The Remaining1 order sides may be displayed for a maximum of a Cross period. Both sides of the orders (customers or market makers) may be available for immediate matching from outside orders during the Cross period. For example, Cross period may be a time period such as 15 seconds. Those skilled in the art will realize that that time period of 15 seconds is exemplary and that a longer or shorter time period may be utilized. The use of regular match algorithms by trade matching engine 106 may apply. A message may be generated to acknowledge the expiration of the Cross period. A flag may also be utilized to indicate Cross period expiration.

In step 239, the trade matching engine 106 may determine if one side of the RFC sides has been completely filled. If one side of the RFC sides has been completely filled then the RFC may be terminated at step 213. Market data and clearing messages may be generated. However, if both sides of the RFC remain then the process advances to step 240.

In step 240, if Cross period time expires and the Remaining$_1$ quantities are equal, then Remaining$_1$ order sides may be automatically matched on trade matching engine 106 with one another (step 242). Moreover, in step 228 market data and clearing messages may be generated. However, if Cross period time expires and the Remaining$_1$ quantities are unequal (step 244), then any Remaining$_1$ equal quantities may be automatically matched by the trade matching engine 106 (step 248) and any residual Remaining$_1$ order quantity may be subject to FAK or limit/session instructions (step 246) as dictated in the original RFC submission. In another aspect of the invention, a RFC may only be valid for the market session in which they were entered. If an unscheduled market pause or close occurs, the RFC may be terminated with the session market change and may not transfer to the next market cycle open. Moreover, in step 228, market data and clearing messages may be generated.

A RFC may be cancelled at any time during the above process. A minimum RFC order may also be established for various products. Orders already matched may be left matched and no subsequent steps may be executed. Also, during the Pre-Cross period other trades based on normal orders may match at any price (above or below the RFC price). Furthermore, the RFC orders may be put last in the time order for price-time priority matching purposes. That is an order entered later in time may match against a RFC order before the other side of the RFC order.

The following examples are meant to help further illustrate various aspects of the invention. For instance, listed below are illustrative examples of when a Best Price Match (BPM) allocation may occur. Those skilled in the art will realize that the following scenarios are meant to provide illustrative examples of BPM allocation in various embodiments and are not meant to limiting. As stated above, if the RFC price is better than the existing order book bid and offer prices at the time the RFC is received by the matching engine (i.e. the beginning of the Pre-Cross period) and the order book prices are not through the RFC price at the conclusion of the Pre-Cross period, then a Better Price Match (BPM) allocation occurs. In an illustrative example, the order book may contain a bid price of $4.00 and an offer price of $6.00. A RFC may be entered with a price of $5.00 for a quantity of 5000 contracts. At the end of the Pre-Cross period, the market may have adjusted to the point where the order book contains a bid price of $5.00 and an offer price of $6.00. A BPM allocation is applied in the above exemplary embodiment as the RFC price is better than the order book bid and offer prices upon receipt by the trade matching engine 106 or exchange computer system 100, and the order book bid or offers prices are not through the RFC price at the conclusion of the Pre-Cross period. After the BPM allocation, the trade matching engine 106 or exchange computer system 100 may match the market's $5.00 bid against the RFC offer. Trade matching engine 106 or exchange computer system 100 may apply the Broker Match Guarantee (BMG) percentage if there is remaining RFC quantity on both sides.

In another illustrative example, the order book may contain a bid price of $5.00 and an offer price of $6.00. A RFC may be entered for a price of $5.00 with a quantity of 5000 contracts. At the end of the Pre-Cross period, the market may not change and the order book may still include a bid price of $5.00 and an offer price of $6.00. Because the RFC price is not better than the markets bid and offer price at the time of receipt by trade matching engine 106, BPM allocation is not applied. The trade matching engine 106 or exchange computer system 100 may match the market's $5.00 bid against the RFC offer. Trade matching engine 106 or exchange computer system 100 may apply BMG if there is remaining RFC quantity on both sides.

In a third illustrative example, the order book may contain a bid price of $4.00 and an offer price of $6.00. A RFC may be entered with a price of $5.00 for a quantity of 5000 contracts. At the end of the Pre-Cross period, the market may include a bid price of $3.00 and an offer price of $4.00. In this example, the order book offer price at $4.00 is through the RFC bid price of $5.00. Therefore, BPM allocation is not applied. The market's $4.00 offer may be matched against the RFC bid and the RFC bid receives the price improvement. Trade matching engine 106 or exchange computer system 100 may apply BMG if there is remaining RFC quantity on both sides.

In a fourth illustrative example, the order book may contain a bid price of $5.00 and an offer price of $6.00. A RFC may be entered with a price of $5.00 for a quantity of 5000 contracts. At the end of the Pre-Cross period, the market may include a bid price of $4.00 and an offer price of $6.00. Because the RFC price is not better than the bid and offer prices at the time the RFC was received into the order book, BPM allocation is not applied.

In a fifth illustrative example, the order book may contain a bid price of $4.00 and an offer price of $6.00. A RFC may be entered with price of $5.00 for a quantity of 5000 contracts. At the end of the Pre-Cross period, the market may include a bid price of $4.00 and an offer price of $6.00. Because the RFC price is better than the order book prices when the RFC was received by the trading system and the order book prices are not through the RFC price at the end of the Pre-Cross period, BPM allocation is applied.

In a sixth illustrative example, the order book may not contain a bid or an offer. A RFC may be entered with price of $5.00 for a quantity of 5000 contracts. At the end of the Pre-Cross period, the market may have not expressed any interest. Because the RFC price is a better price (and only price), BPM allocation is applied at the end of the Pre-Cross period.

Figure 4:
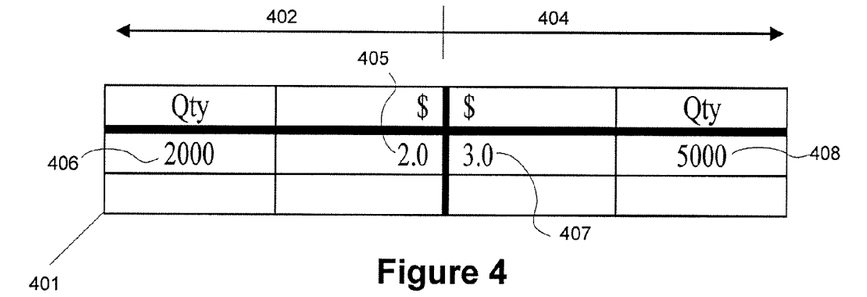
FIGS. 4-6 show the type of data that may be included in an order book in one illustrative example of the invention in accordance with an aspect of the invention.

The following examples are described in conjunction with FIGS. 2 and 3. In a first exemplary scenario, a RFC is executed at a price between the bid and offer price found in an order book. In particular, FIG. 4 illustrates entries into an order book 401. The order book 401 may be layout such that bids 402 are placed in the left hand side of order book 401 and offers 404 are placed on the right hand side of order book 401. As described above in FIGS. 2 and 3, a customer may contact a broker to express an interest for various trades in step 202. In response to the customer inquiry, the broker in a step 204 may submit a request for quote (RFQ). The RFQ may ask marketplace participants to post the liquidity for a particular instrument of interest to the broker and customer. In response to the RFQ, orders or quotes may be submitted by market participants as illustrated in step 206. For example in response to a broker's RFQ, a response such as a bid price of $2.00 dollars (405) for a quantity of 2000 contracts (406) and an offer price of $3.00 dollars (407) for a quantity of 5000 contracts (408) may be received in response to the RFQ for a particular instrument These price and quantities may be placed in order book 401 as illustrated in FIG. 4.

In step 208, the broker may receive an initiating order from a customer. The initiating order may include the price and quantity requested by the customer. For example, the broker may receive an initiating order to sell 10,000 contracts at a price of $2.50 dollars per contract.

Next in step 210, a price and quantity requested by the customer may be compared to orders that have been entered into order book 401. If the price and quantity in the order book 401 fully meet the customer's initiating order, then in step 212 the order book's bid or offer may be manually swept by the broker to the extent of the initiating order. As the customer's order has been completed the process ends at step 213.

However, if the price and quantity entered in the order book 401 do not fully meet the customer's initiating order then, the broker may call around in step 214 to find an opposite side to customer's initiating order. For example, the broker may find a customer wanting to buy 10,000 contracts at a price of $2.50 per contract. In order to find a match, the broker may contact various market makers (MMs) and request their best price for the other side of the customer's order without revealing the full order information (maybe only the quantity and the type of product). Communications between broker and customer may be accomplished through various media such as e-mail, instant messaging, telephone, and/or other communication devices or methods. Those skilled in the art will realize that other forms of communication may be utilized in order to find an opposite side to the customer's initiating order. Based on this order, the broker submits the RFC at $2.50 per contract. The request as described in step 216 may be in the form of a two sided request for cross (RFC) message initiated by the broker.

The market trade matching engine 106 may accept the RFC and in step 218 a Pre-Cross period starts. The two sided RFC message may be sent out on the market data feed indicating to all market participants that a request for cross (RFC) in a particular product has occurred. The price and quantity may not be revealed to the market participants, only the existence of the RFC. The informed market participants may know that that the RFC was issued. This may allow additional market participants to submit new orders to the order book 401.

In step 220, orders and quotes may be submitted in response to the RFC during the Pre-Cross period. The Pre-Cross period may include a time period such as 15 seconds before proceeding to allow new orders to be sent to the system. After expiration of the Pre-Cross period, the market's response may still be a bid price of $2.00 dollars (405) for a quantity of 2000 contracts (406) and an offer price of $3.00 dollars (407) for a quantity of 5000 contracts (408) as shown in FIG. 4.

In step 222 of FIG. 3, the Pre-Cross period expires after the selected time period. Price and quantity may be compared to orders in the order book 401 in step 224 to determine if price and quantity match either side of the RFC. In this example, the price and the quantities do not match either side of the RFC.

Next, in step 223, if the RFC price is better than the existing order book bid and ask prices at the time the RFC is received by the matching engine (i.e. the beginning of the Pre-Cross period) and the order book prices are not through the RFC price at the conclusion of the Pre-Cross period, then a Better Price Match (BPM) allocation occurs for twenty-five percent (step 225) of the RFC order quantity. Those skilled in the art will realize that the allocation percentage is exemplary and may be higher or lower in various different aspects of the invention. Therefore, as the criterion in step 223 has been satisfied in step 225, a Better Price match occurs for twenty-five percent of the order. Those skilled in the art will realize that the allocation percentage is exemplary and may be higher or lower in various different aspects of the invention. In this example, twenty-five (25) percent of the 10,000 contracts is equivalent to 2,500 contracts at a price of $2.50 per contract.

Next, in step 234, a Broker Match Guarantee (BMG) allocation occurs for sixty (60) percent of the remainder of the order (customer order amount less matched above). Those skilled in the art will realize that the allocation percentage is exemplary and may be higher or lower in various different aspects of the invention. In this example, sixty (60) percent of the remaining 7,500 contracts is equivalent to 4,500 contracts at a price of $2.50 per contract.

Figure 5:
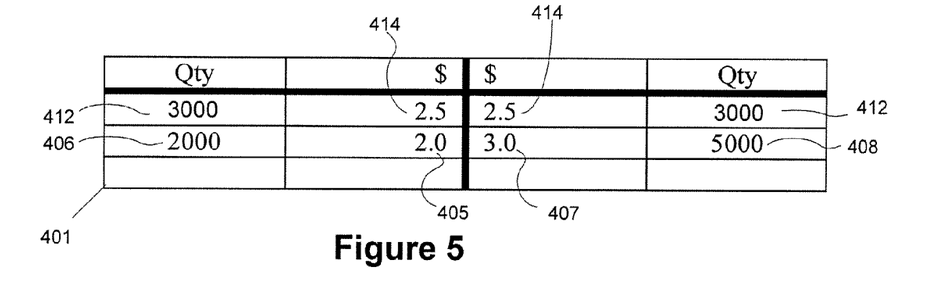

In step 236, the customer's order and market maker's order for the residual amount may be automatically displayed in the order book for both bid and offer sides (Remaining1). The Remaining1 order sides may be displayed for a maximum of Cross period. Both sides of the orders (customers or market makers) may be available for immediate matching from outside orders during the Cross period. For example, Cross period may be a time period such as 15 seconds. Those skilled in the art will realize that the 15 second time period is exemplary and that a longer or shorter time period may be utilized. The order book 401 may appear as illustrated in FIG. 5 wherein the Remaining1 3000 contracts (412) for a price of $2.50 (414) per contract may be displayed. During the Cross period, the market may have the opportunity to buy and/or sell the remaining contracts. The use of regular match algorithms by the trade matching engine 106 may apply.

Next, in step 239 the trade matching engine 106 may determine if one side of the RFC sides has been completely filled. If one side of the RFC sides has been completely filled then the RFC may be terminated at step 213. Market data and clearing messages may be generated. However, if both sides of the RFC remain then the process advances to step 240. In this exemplary example, both sides of the RFC remain.

Figure 6:
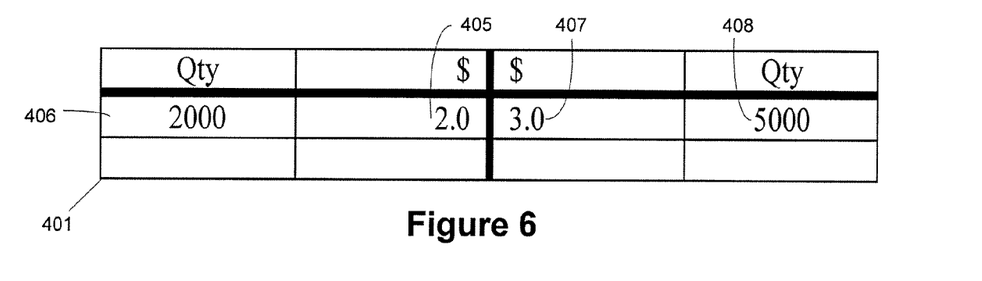

Next in step 240 and FIG. 6, if Cross period time expires and the Remaining1 quantities are equal, and then Remaining1 order sides may automatically match on the trade matching engine 106 with one another (step 242). For example, the trade matching engine 106 crosses the RFC balance of 3000 contracts (412) at a price of $2.50 (414) per contract. Moreover, in step 228 market data and clearing messages may be generated. Because Cross period time has expired and Remaining1 quantities are unequal (step 244), the residual Remaining1 quantities of 2000 contracts (406) at $2.00 (405) and 5000 contracts (408) at $3.00 (407) are subject to FAK or limit/session instructions as dictated in the original RFC submission.

In a second exemplary scenario, an RFC may partially match the best bid in an order book. In particular, FIG. 7 illustrates entries into an order book 701. The order book 701 may be layout such that bids 702 are placed in the left hand side of order book 701 and offers 704 are placed on the right hand side of order book 701. As described above in FIGS. 2 and 3, a customer may contact a broker to express an interest for various trades in step 202. In response to the customer inquiry, the broker in a step 204 may submit a request for quote (RFQ). The RFQ may ask marketplace participants to post the liquidity for a particular instrument of interest to the broker and customer. In response to the RFQ, orders or quotes may be submitted by market participants as illustrated in step 206. For example in response to a broker's RFQ, a response such as a bid price of $2.00 dollars (705) for a quantity of 2000 contracts (706) and an offer price of $3.00 dollars (707) for a quantity of 5000 contracts (708) may be received in response to the RFQ for a particular instrument These prices and quantities may be placed in order book 701 as illustrated in FIG. 7.

In step 208, the broker may receive an initiating order from a customer. The initiating order may include the price and quantity requested by the customer. For example, the broker may receive an initiating order to sell 10,000 contracts at a price of $2.00 dollars per contract.

Next in step 210, a price and quantity requested by the customer may be compared to orders that have been entered into order book 701. If the price and quantity in the order book 701 fully meet the customer's initiating order, then in step 212 the order book's bid or offer may be manually swept by the broker to the extent of the initiating order. As the customer's order has been completed, the process ends at step 213.

However, if the price and quantity entered in order book 701 do not fully meet the customer's initiating order then, the broker may call around in step 214 to find an opposite side to customer's initiating order. For example, the broker may find a market maker wanting to buy 10,000 contracts at a price of $2.00 per contract. Based on this order the broker requests to cross the trade (RFC) at $2.00 per contract. The request as described in step 216 may be in the form of a two sided request for cross (RFC) message initiated by the broker.

The trade matching engine 106 may accept the RFC and in step 218 a Pre-Cross period starts. The two sided RFC message may be sent out on the market data feed indicating to all market participants that a request for cross (RFC) in a particular product has occurred. The price and quantity may not be revealed to the market participants, only the existence of the RFC. The informed market participants may know that that the RFC was issued. This may allow additional market participants to submit new orders to the order book 701.

In step 220, orders and quotes may be submitted in response to the RFC during the Pre-Cross period. The Pre- Cross period may include a time period such as 15 seconds before proceeding to allow new orders to be sent to the system. In step 222 of FIG. 3, Pre-Cross period expires after the selected time period. After expiration of the Pre-Cross period, the market's response may be as shown in FIG. 8. In FIG. 8, a bid price of $2.00 dollars (712) for a quantity of 2500 contracts (714) and an offer price of $3.00 dollars (707) for a quantity of 5000 contracts (708) may be received from the marketplace.

Next, in step 224 price and quantity may be compared to orders in order book 701 to see if price and quantity match either side of the RFC. In this example, step 224 is satisfied because the new bid order of $2.00 dollars (712) for a quantity of 2500 contracts (714) matches the RFC offer price but the quantity is insufficient. The engine automatically fills the order for 2500 contracts (714) at $2.00 dollars (712) per contract. FIG. 9 illustrates order book 701 after the engine fills the order.

In step 227, the trade matching engine 106 may check to determine whether either side of the order was completely filled. If either side of the RFC order was completely filled then the RFC may be ended (step 213) and the remaining side of the order may be subject to FAK or limit/session instructions as dictated in the original RFC submission. Moreover, market data and clearing messages may be generated in step 228. If only a portion of either side of the RFC order was matched then the remaining portion advances to step 234 to determine if a Broker Match Guarantee allocation may be applied.

If price and quantity do not match either side of the RFC (step 224), then in step 223, it may be determined if a Better Price Match (BPM) allocation will be applied. In this exemplary embodiment, a BPM allocation does not occur.

Next, in step 234, a Broker Match Guarantee (BMG) allocation occurs for sixty (60) percent of the remainder of the order (customer order amount less matched above). Those skilled in the art will realize that the allocation percentage is exemplary and may be higher or lower in various different aspects of the invention. In this example, sixty (60) percent of the remaining 7,500 contracts is equivalent to 4,500 contracts at a price of $2.00 per contract. In step 228, market data and clearing messages may be generated for the guaranteed BMG allocation percentage.

In step 236, the customer's order and market maker's order for the residual amount may be automatically displayed in the order book 701 for both bid and offer sides (Remaining1). The Remaining1 order sides may be displayed for a maximum of Cross period. Both sides of the orders (customers or market makers) may be available for immediate matching from outside orders during the Cross period. For example, Cross period may be a time period such as 15 seconds. Those skilled in the art will realize that that time period of 15 seconds is exemplary and that a longer or shorter time period may be utilized. The order book 701 may appear as illustrated in FIG. 10 wherein the Remaining1 5500 bid balance contracts (722) for a price of $2.00 (724) per contract and the 3000 offers contracts (726) for a price of $2.00 (728) may be displayed. During the Cross period, the market may have the opportunity to buy and/or sell the remaining contracts. The use of regular match algorithms by the trade matching engine 106 may apply. In the example, the market does not buy or sell at a price of $2.00 per contract on either side of the market.

Next, in step 239 the trade matching engine 106 may determine if one side of the RFC sides has been completely filled. If one side of the RFC sides has been completely filled then the RFC may be terminated at step 213. Market data and clearing messages may be generated. However, if both sides of the RFC remain then the process advances to step 240. In this exemplary example, both sides of the RFC remain.

Next in step 240 and FIG. 6, if Cross period time expires and the Remaining1 quantities are equal, and then Remaining1 order sides may automatically match on the trade matching engine 106 with one another. For example, the engine crosses the RFC balance of 3000 contracts (726) at a price of $2.00 (728) per contract. Moreover, in step 228 market data and clearing messages may be generated. Because Cross period time has expired and Remaining1 quantities are unequal (step 244), the residual Remaining1 quantities of 2500 contracts (not shown) at $2.00 and 5000 contracts (708) at $3.00 (707) are subject to FAK or limit/session instructions as dictated in the original RFC submission. In this example, the remaining 2,500 contracts on the bid are cancelled as the broker gave FAK instructions. The order book 701 after the transactions may still show the initial 5,000 offer contracts (708) at $3.00 (707) per contract as illustrated in FIG. 11.

Figure 12:
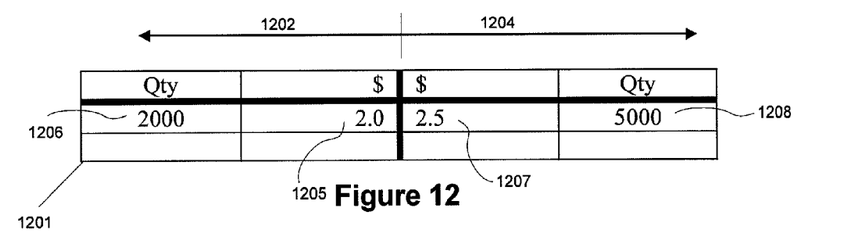
FIGS. 12-16 show the type of data that may be included in an order book in a third illustrative example of the invention in accordance with an aspect of the invention.

In a third exemplary scenario, one side of an RFC may get a better fill price due to an intervening order price. In particular, FIG. 12 illustrates entries into an order book 1201. The order book 1201 may be layout such that bids 1202 are placed in the left hand side of order book 1201 and offers 1204 are placed on the right hand side of order book 1201. As described above in FIGS. 2 and 3, a customer may contact a broker to express an interest for various trades in step 202. In response to the customer inquiry, the broker in step 204 may submit a request for quote (RFQ). The RFQ may ask marketplace participants to post the liquidity for a particular instrument of interest to the broker and customer. In response to the RFQ, orders or quotes may be submitted by market participants as illustrated in step 206. For example in response to a broker's RFQ, a response such as a bid price of $2.00 dollars (1205) for a quantity of 2000 contracts (1206) and an offer price of $2.50 dollars (1207) for a quantity of 5000 contracts (1208) may be received in response to the RFQ for a particular instrument These prices and quantities may be placed in order book 1201 as illustrated in FIG. 12.

In step 208, the broker may receive an initiating order from a customer. The initiating order may include price and quantity requested by the customer. For example, the broker may receive an initiating order to sell 10,000 contracts at a price of $2.00 dollars per contract.

Next in step 210, a price and quantity requested by the customer may be compared to orders that have been entered into order book 1201. If the price and quantity in the order book 1201 fully meet the customer's initiating order, then in step 212 the order book's bid or offer may be manually swept by the broker to the extent of the initiating order. As the customer's order has been completed the process ends at step 213.

However, if the price and quantity entered in the order book 1201 do not fully meet the customer's initiating order then, the broker may call around in step 214 to find an opposite side to customer's initiating order. For example, the broker may find a customer wanting to buy 10,000 contracts at a price of $2.00 per contract. Based on this order, the broker requests to cross the trade (RFC) at $2.00 per contract. The request as described in step 216 may be in the form of a two sided request for cross (RFC) message initiated by the broker.

The trade matching engine 106 may accept the RFC and in step 218 a Pre-Cross period starts. The two sided RFC message may be sent out on the market data feed indicating to all market participants that a request for cross (RFC) in a particular product has occurred. The price and quantity may not be revealed to the market participants, only the existence of the RFC. The informed market participants may know that that the RFC was issued. This may allow additional market participants to submit new orders to the order book 1201.

Figure 13:
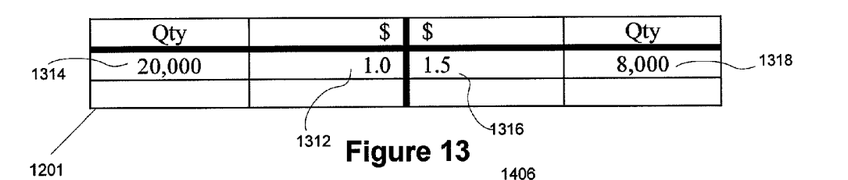

In step 220, orders and quotes may be submitted in response to the RFC during the Pre-Cross period. The Pre-Cross period may include a time period such as 15 seconds before proceeding to allow new orders to be sent to the system. In step 222 of FIG. 3, Pre-Cross period expires after the selected time period. After expiration of the Pre-Cross period, the market's response may be as shown in FIG. 13. In FIG. 13, a bid price of $1.00 dollar (1312) for a quantity of 20,000 (1314) contracts and an offer price of $1.50 dollars (1316) for a quantity of 8000 contracts (1318) may be received from the marketplace.

In step 222 of FIG. 3, the Pre-Cross period expires after the selected time period. In step 224, price and quantity may be compared to orders in order book 1201 to determine if price and quantity match either side of the RFC. In this example, trade matching engine 106 may match 8,000 contracts on the RFC market maker buy side. This matching may result in a price of $1.50 per contract which means that the RFC market maker buy side gets a better price for the 8,000 contracts. In other words, the market maker intended to buy at $2.00 per contract but the order was filed at $1.50 per contract.

In step 227, the trade matching engine 106 may check to determine whether either side of the order was completely filled. If either side of the RFC order was completely filled then the RFC may be ended (step 213) and the remaining side of the order may be subject to FAK or limit/session instructions as dictated in the original RFC submission. Moreover, market data and clearing messages may be generated in step 228. If only a portion of either side of the RFC order was matched then the remaining portion advances to step 234.

Because there was insufficient quantity to meet one side of the RFC, the Broker Guarantee Match (BMG) allocation occurs in step 234. The BMG may occur for sixty (60) percent of the remainder of the order (customer order amount less matched above). Those skilled in the art will realize that the allocation percentage is exemplary and may be higher or lower in various different aspects of the invention.

Figure 14:
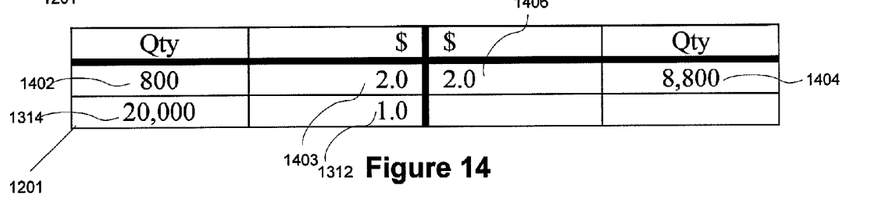

In this example, sixty (60) percent of the remaining 2,000 contracts is equivalent to 1,200 contracts at a price of $2.00 per contract. After the BMG, the market maker may have 800 contracts (1402) at $2.00 (1403) left and the RFC initiator side has 8,800 contracts (1404) at $2.00 (1406) remaining as illustrated in FIG. 14. In step 228, market data and clearing messages may be generated for the guaranteed BMG allocation percentage.

Next, in step 236, the user's order or market maker's order for the residual amount may be automatically displayed in the order book 1201 for both bid and offer sides (Remaining1). The Remaining1 order sides may be displayed for a maximum of Cross period. For example, Cross period may be a time period such as 15 seconds. Those skilled in the art will realize that that time period of 15 seconds is exemplary and that a longer or shorter time period may be utilized.

Figure 15:
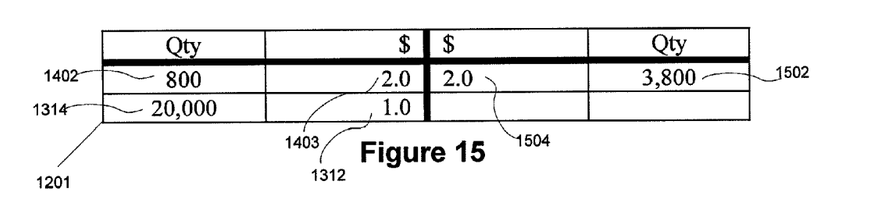

During the Cross period, the market may have the opportunity to buy and/or sell the remaining contracts. In this example, the offer is manually matched by another user for 5,000 contracts as shown in FIG. 15. In FIG. 15, the offer side 1204 has only 3,800 contracts (1502) at a price of $2.00 (1504) per contract. The use of regular match algorithms by trade matching engine 106 may apply. Moreover, in step 228, market data and clearing messages may be generated. In the example, the market does not buy or sell at a price of $2.00 per contract on either side of the market.

Next, in step 239 the trade matching engine 106 may determine if one side of the RFC sides has been completely filled. If one side of the RFC sides has been completely filled then the RFC may be terminated at step 213. Market data and clearing messages may be generated. However, if both sides of the RFC remain then the process advances to step 240. In this exemplary example, both sides of the RFC remain.

Figure 16:
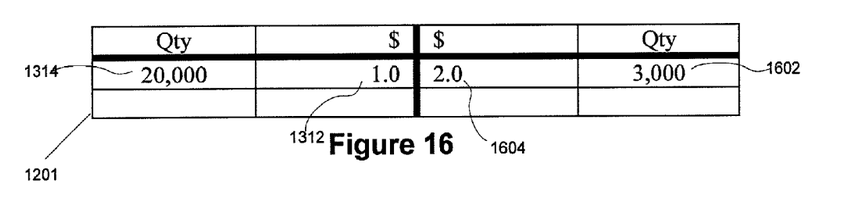

Next in step 240 and FIG. 14, if Cross period time expires and the Remaining1 quantities are equal then Remaining1 order sides may automatically match on the trade matching engine with one another. In this third example, the Remaining1 quantities are not equal so the trade matching engine 106 moves to step 244. When the Cross period time expires, 800 contracts (1402) at a price of $2.00 (1403) are matched by the engine. The remaining 3000 contracts (1602) at a price of $2.00 (1604) per contract remains on order book 1201 as the order were specified with limit/session orders.

The present invention has been described herein with reference to specific exemplary embodiments thereof. It will be apparent to those skilled in the art that a person understanding this invention may conceive of changes or other embodiments or variations, which utilize the principles of this invention without departing from the broader spirit and scope of the invention as set forth in the appended exemplary aspects of the invention. All are considered within the sphere, spirit, and scope of the invention.

We claim:

1. A method of implementing a trade in a trade matching system between a customer and a market maker, the method comprising:
   (a) receiving a request for cross order from a broker, the request for cross order comprising a cross order price, a first order, and a second order, wherein the first order is a trading position that is opposite of the second order, wherein the first order is an order of one of the customer and the market maker, and wherein the second order is an order of the other of the customer and the market maker;
   (b) notifying market participants other than the customer and the market maker of the request for cross order;
   (c) prompting the notified market participants to submit orders during a first time period;
   (d) matching an order received from a first of the market participants during the first time period against a portion of the first order at a price that differs from the cross order price, wherein the first market participant is not the customer or the market maker;
   (e) after the matching in (d), determining a remaining quantity of the first order;
   (f) after the determination in (e), matching a portion of the first order remaining quantity against the second order at the cross order price, wherein the matched portion of the first order remaining quantity is less than all of the first order remaining quantity;
   (g) after the matching of (f), determining a residual quantity of the first order and a residual quantity of the second order based on the matching in (d) and the matching in (f);
   (h) after the determining of (g), prompting the market participants to submit further orders during a second time period; and
   (i) electronically matching by a processor a further order received from one of the market participants during the second time period against the residual quantity of the first order or the residual quantity of the second order.

2. The method of claim 1, wherein the first time period and second time period are adjustable.

3. The method of claim 1, further comprising adjusting a percentage of the first order remaining quantity that is matched against the second order.

4. The method of claim 1, wherein the request for cross order includes limit session instructions and fill and kill (FAK) instructions.

5. The method of claim 1, wherein the notifying of the market participants of the request for cross includes price and quantity for a financial instrument.

6. The method of claim 5, wherein the financial instrument includes Eurodollar futures.

7. The method of claim 5, wherein the financial instrument includes Eurodollar options.

8. The method of claim 1, wherein the first time period is a Pre-Cross period.

9. The method of claim 1, wherein the second time period is a Cross period.

10. An apparatus comprising:
a processor; and
a computer readable medium including computer-executable instructions that, when executed by the processor, cause the apparatus at least to:
(a) receive a request for cross order from a broker, the request for cross order comprising a cross order price, a first order, and a second order, wherein the first order is a trading position that is opposite of the second order, wherein the first order is an order of one of a customer and a market maker, and wherein the second order is an order of the other of the customer and the market maker;
(b) notify market participants other than the customer and the market maker of the request for cross order;
(c) prompt the notified market participants to submit orders during a first time period;
(d) match an order received from one of the market participants during the first time period against a portion of the first order at a price that differs from the cross order price, wherein the first market participant is not the customer or the market maker;
(e) after matching of (e), determine a remaining quantity of the first order;
(f) after the determination in (e), match a portion of the first order remaining quantity against the second order at the cross order price, wherein the matched portion of the first order remaining quantity is less than all of the first order remaining quantity;
(g) after the matching of (f), determine a residual quantity of the first order and a residual quantity of the second order based on the matching in (d) and the matching in (f);
(h) after the determining of (g), prompt the market participants to submit further orders during a second time period; and
(i) match a further order received from one of the market participants during the second time period against the residual quantity of the first order or the residual quantity of the second order.

11. The apparatus of claim 10, wherein the computer readable medium further includes computer-readable instructions that, when executed, cause the apparatus to adjust a percentage of the remaining quantity of the first order that is matched against the second order.

12. The apparatus of claim 10, wherein the first time period and the second time period are adjustable.

13. The apparatus of claim 10, wherein the request for cross order includes limit session instructions and fill and kill (FAK) instructions.

14. The apparatus of claim 10, wherein the notifying of the market participants of the request for cross includes price and quantity for a financial instrument.

* * * * *